Patented Jan. 21, 1941

2,229,222

UNITED STATES PATENT OFFICE 2,229,222

HEXOIC ACID ESTERS

George H. Reid, South Charleston, W. Va., assignor to Carbide and Carbon Chemicals Corporation, a corporation of New York No Drawing. Application October 10, 1936,
Serial No. 105,082

8 Claims. (Cl. 260—488)

The invention relates to new ester compounds, in particular those derived from six carbon atom monocarboxylic acids by reaction with a polyalkylene glycol. It is especially concerned with polyalkylene glycol dihexoates formed by the complete esterification of the polyglycols with two molecules of the acid, which may be a normal straight chain hexoic acid, or isomers thereof, such as 2-ethylbutyric acid and 2-methylpentoic acid. Suitable polyglycols include those of the polyethylene series, represented by diethylene glycol, triethylene glycol, tetraethylene glycol and pentaethylene glycol, or higher polyalkylene glycols, such as the corresponding polypropylene glycols. Mixed propylene ethylene glycols, and the like, are also within the group of appropriate polyglycol reactants of the invention.

These new esters are liquids of a water-white or very faint color, and of little or no odor. They are relatively high-boiling compounds, having a solvent action on nitrocellulose, other cellulose derivatives, and many of the natural and synthetic gums and resins. Among other valuable properties are characteristics excellently adapting the esters as plasticizers and softening agents in lacquers and plastic compositions employing various resinous material.

The method of preparing the esters consists in an esterification in which the polyglycol and a hexoic acid are refluxed in the presence of sulfuric acid, or other suitable catalyst, and a water-removing agent, such as benzene or toluene. To insure complete esterification of both hydroxyl groups of the polyglycol, the molar ratio of the reactants is maintained slightly in excess of two to one in favor of the hexoic acid.

The following examples show certain specific ester compounds representative of my invention, and indicate in tabular form the reaction data employed in preparing them.

EXAMPLE 1

Diethylene glycol di-n-hexoate

This compound is a water-white liquid, insoluble in water, having a specific gravity of 0.982 at 20°/20° C., a boiling point of 158° to 159° C. at 1.5 mm. of mercury absolute pressure, and a saponification equivalent of 153.1. It was prepared under reaction conditions as follows:

| | |
|---|---:|
| Diethylene glycol_____grams__ | 318 |
| n-Hexoic acid_____do____ | 765 |
| Sulfuric acid_____do____ | 4.5 |
| Toluene_____cc.___ | 400 |
| Reaction temperature_____°C.__ | 110–146 |
| Reaction time_____hours__ | 2¾ |
| Water layer recovered_____grams__ | 125 |
| Product recovered_____do____ | 754 |
| Yield_____per cent__ | 83 |

EXAMPLE 2

Triethylene glycol di-n-hexoate

This compound is a water-white liquid, insoluble in water, having a specific gravity of 0.996 at 20°/20° C., a boiling point of 201° C. at 3.5 mm. pressure, and a saponification equivalent of 173.5. It was prepared under reaction conditions as follows:

| | |
|---|---:|
| Triethylene glycol_____grams__ | 750 |
| n-Hexoic acid_____do____ | 1300 |
| Sulfuric acid_____do____ | 4 |
| Toluene_____cc.___ | 400 |
| Reaction temperature_____°C.__ | 110–160 |
| Reaction time_____hours__ | 2¾ |
| Water layer recovered_____grams__ | 186 |
| Product recovered_____do____ | 1091 |
| Yield_____per cent__ | 63 |

EXAMPLE 3

Triethylene glycol-di-2-methyl pentoate

This compound is a water-white liquid, of faint odor, insoluble in water. It has a specific gravity of 0.994 at 20°/20° C., a boiling point of 171° to 173° C. at 1.5 mm. pressure, and a saponification equivalent of 171.4. The ester was prepared under reaction conditions as follows:

| | |
|---|---:|
| Triethylene glycol_____grams__ | 300 |
| 2-methyl pentoic acid_____do____ | 487 |
| Sulfuric acid_____cc.___ | 1.5 |
| Benzene_____cc.___ | 250 |
| Reaction temperature_____°C.__ | 126–151 |
| Reaction time_____hours__ | 1 |
| Water layer removed_____grams__ | 72 |
| Product recovered_____do____ | 474 |
| Yield_____per cent__ | 68.5 |

EXAMPLE 4

Diethylene glycol di-2-ethylbutyrate

This compound is a water-white liquid of faint odor, insoluble in water. It has a specific gravity of 0.979 at 20°/20° C., a boiling point of 148° C. at 2 mm. pressure, and a saponification equivalent of 149.5. The ester was prepared under reaction conditions as follows:

| | |
|---|---:|
| Diethylene glycol_____grams__ | 630 |
| 2-ethyl butyric acid_____do____ | 1275 |
| Sulfuric acid_____cc.___ | 2 |
| Benzene_____cc.___ | 300 |
| Reaction time_____hours__ | 5¾ |

EXAMPLE 5

Triethylene glycol di-2-ethylbutyrate

This compound is a water-white liquid of faint odor, insoluble in water. It has a specific gravity of 0.994 at 20°/20° C., a boiling point of 181.5° C. at 3.5 mm. pressure and a saponification equivalent of 176. The ester was prepared under reaction conditions as follows:

| | | |
|---|---|---|
| Triethylene glycol | grams | 1100 |
| 2-ethyl butyric acid | do | 1700 |
| Sulfuric acid | cc | 5 |
| Benzene | cc | 300 |
| Reaction temperature | °C | To 175 |
| Reaction time | hours | 4 |

EXAMPLE 6

*Tetraethylene glycol di-2-ethylbutyrate*

This compound is a liquid of faintly yellow color, and slight odor. It is insoluble in water, has a specific gravity of 1.012 at 20°/20° C. and a saponification equivalent of 200. It was prepared under reaction conditions as follows:

| | | |
|---|---|---|
| Tetraethylene glycol | grams | 1035 |
| 2-ethylbutyric acid | do | 1230 |
| Sulfuric acid | cc | 5 |
| Benzene | cc | 300 |
| Reaction temperature | °C | 124–148 |
| Reaction time | hours | 5¼ |

EXAMPLE 7

*Pentaethylene glycol di-2-ethylbutyrate*

This compound is a faintly yellow liquid, of slight odor, insoluble in water. It has a specific gravity of 1.022 at 20°/20° C. and a saponification equivalent of 221. The ester was prepared under reaction conditions as follows:

| | | |
|---|---|---|
| Pentaethylene glycol | grams | 714 |
| 2-ethylbutyric acid | do | 696 |
| Sulfuric acid | cc | 1 |
| Benzene | cc | 300 |
| Reaction temperature | °C | To 150 |
| Reaction time | hours | 4 |

The esters of this invention, particularly those described in the above examples, have shown exceptional plasticizing characteristics when compounded with various resinous materials. The softening power of the polyalkylene glycol dihexoates is considerably greater than that of well known plasticizing materials, including such compounds as dibutyl phthalate and tricresyl phosphate. Plastic compositions of unusually good elasticity and resiliency have been made in mixtures of the new esters with nitrocellulose and vinyl resins. In the forming of plastic compositions suitable for making laminated non-shattering glass the polyglycol hexoates have proven to be particularly valuable, and as plasticizers in mixture with vinyl resins have produced for this purpose a reinforcing plastic material of remarkable improvement in strength, clarity, adhesion and permanent resiliency.

Certain partial polyvinyl acetal resins have recently assumed considerable importance as a source of laminated glass plastics. These are resins such as may be prepared by incomplete condensation of aldehydes with polyvinyl alcohol, and contain in the polymeric aggregate both acetal groups and free alcoholic hydroxyl groups. Especially desirable for such plastics are the resins prepared from a high molecular weight polyvinyl alcohol or an ester thereof, which has been acetalized from about 54% to 78% with butyraldehyde. With this type of resin the hexoic acid esters of this invention have been found to impart a plasticizing action superior to any other known plasticizing materials. This superiority has been proven by numerous tests comparing the resistance to failure by breaking or shattering of samples of laminated glass in which different plastic compositions were used as the reinforcing layer. Plastics formed from partial polyvinyl acetal resins with polyglycol dihexoates as a plasticizer have consistently shown by these tests greater strength and toughness at both high and low temperatures than those made from the same resins compounded with plasticizers such as diethyl phthalate, dibutyl phthalate and tricresyl phosphate. Due to the low vapor pressure and other properties of the new plasticizers, they are retained within the plastic to a remarkable degree. This is evident from the bubble test wherein laminated glass containing the improved plastic has remained clear and bubble-free when heated to a temperature of 260° F. for periods as long as 320 hours, while under a similar degree of heat the same resin compounded with known plasticizers, typified by dibutylphthalate, has shown serious bubbling after 45 minutes. The clearness and resiliency of the reinforcing film containing the new ester is therefore more nearly permanent, and other essential properties of laminated glass are enhanced by such a plastic.

Uses of the new ester compositions are not contemplated by the present invention, but those particularly described will emphasize the new and unexpected properties inherent in these compounds. The examples show specific hexoic acid esters which have already proven to be of extensive value as plasticizers, but the invention is intended to include other esters as well, within the scope of the appended claims.

I claim:

1. As new chemical compounds, polyalkylene glycol dihexoates.

2. As new chemical compounds, polyethylene glycol dihexoates.

3. As new chemical compounds, polyalkylene glycol dihexoates of the group consisting of n-hexoates, 2-ethyl butyrates and 2-methyl pentoates.

4. As new chemical compounds, polyethylene glycol dihexoates of the group consisting of n-hexoates, 2-ethyl butyrates and 2-methyl pentoates.

5. As new chemical compounds, triethylene glycol dihexoates of the group consisting of n-hexoates, 2-ethyl butyrates and 2-methyl pentoates.

6. As a new chemical compound, triethylene glycol di-n-hexoate.

7. As a new chemical compound, triethylene glycol di-2-ethyl butyrate.

8. As a new chemical compound, triethylene glycol di-2-methyl pentoate.

GEORGE H. REID.

CERTIFICATE OF CORRECTION.

Patent No. 2,229,222. January 21, 1941.

GEORGE H. REID.

It is hereby certified that error appears in the printed specification of the above numbered patent requiring correction as follows: Page 1, second column, line 15, in the table, for "hours-- 2 3/4" read --hours-- 2--; and that the said Letters Patent should be read with this correction therein that the same may conform to the record of the case in the Patent Office.

Signed and sealed this 25th day of February, A. D. 1941.

(Seal)

Henry Van Arsdale,
Acting Commissioner of Patents.